(12) United States Patent
Ervin

(10) Patent No.: US 9,466,435 B2
(45) Date of Patent: Oct. 11, 2016

(54) SUPERCAPACITOR

(71) Applicant: U.S. Army Research Laboratory ATTN: RDRL-LOC-I, Adelphi, MD (US)

(72) Inventor: Matthew H. Ervin, Clarksville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 125 days.

(21) Appl. No.: 14/328,128

(22) Filed: Jul. 10, 2014

(65) Prior Publication Data

US 2016/0012978 A1 Jan. 14, 2016

(51) Int. Cl.
| | |
|---|---|
| *H01G 11/26* | (2013.01) |
| *H01G 11/36* | (2013.01) |
| *H01G 11/38* | (2013.01) |
| *H01G 11/86* | (2013.01) |
| *H01G 11/28* | (2013.01) |
| *H01G 11/32* | (2013.01) |

(52) U.S. Cl.
CPC ............. *H01G 11/26* (2013.01); *H01G 11/28* (2013.01); *H01G 11/32* (2013.01); *H01G 11/36* (2013.01); *H01G 11/38* (2013.01); *H01G 11/86* (2013.01)

(58) Field of Classification Search
CPC ...... H01G 11/26; H01G 11/38; H01G 11/86; H01G 11/36
See application file for complete search history.

(56) References Cited

U.S. PATENT DOCUMENTS

| | | | | |
|---|---|---|---|---|
| 6,233,135 B1 * | 5/2001 | Farahmandi | ........... | H01G 9/038 361/502 |
| 6,621,686 B1 * | 9/2003 | Jenn-Feng | ........... | A61N 1/3956 361/503 |
| 2008/0013255 A1 * | 1/2008 | Schneuwly | .......... | H01G 9/0029 361/502 |
| 2008/0014504 A1 * | 1/2008 | Schneuwly | ............. | B26D 3/06 429/245 |
| 2009/0262485 A1 * | 10/2009 | Sakata | ................... | H01G 9/016 361/502 |
| 2011/0235240 A1 * | 9/2011 | Lu | ......................... | H01G 11/46 361/502 |
| 2011/0255214 A1 * | 10/2011 | Gruner | ................... | B82Y 30/00 361/502 |
| 2013/0342963 A1 * | 12/2013 | Besesty | ................. | H01G 11/10 361/502 |
| 2014/0002960 A1 * | 1/2014 | Tezuka | ................... | H01G 11/06 361/508 |

FOREIGN PATENT DOCUMENTS

| | | | | |
|---|---|---|---|---|
| JP | 03283523 | A | * | 12/1991 |
| JP | 04022117 | A | * | 1/1992 |
| JP | 05021013 | A | * | 1/1993 |
| JP | 2011210995 | A | * | 10/2011 |

OTHER PUBLICATIONS

Jaegar, Introduction to Microelectronic Fabrication, 2002, Prentice-Hall Inc., Second Edition, p. 17-27.*

(Continued)

*Primary Examiner* — David M Sinclair
(74) *Attorney, Agent, or Firm* — Eric Brett Compton

(57) ABSTRACT

A supercapacitor or electrochemical capacitor includes spaced apart electrodes which are separated from each other by a separator made of an electrical insulating material. Each electrode is formed of carbonaceous material and capable of being impregnated with a liquid electrolyte. Metal current collectors are provided on the sides of the electrodes opposite from the separator. The electrodes have holes extending through the electrodes to reduce ionic impedance in order to produce faster charging and discharging of the device.

19 Claims, 3 Drawing Sheets

(56) References Cited

OTHER PUBLICATIONS

X. Zhang et al., "Graphene nanostructures toward clean energy technology applications," Energy Environ. vol. 1, 2012, pp. 317-336.

C.-M. Chen et al., "Macroporous 'bubble' graphene film van template-directed ordered assembly for high-rate supercapacitors," Chemical Communications 48 (57), 7149-7151 (2012).

M. Beidaghi et al., "Electrostatic spray deposition of graphene nanoplatelets for high-power thin film supercapacitor electrodes," J Solid State Electrochem (2012) 16:3341-3348.

K. Sheng et al., "Ultrahigh-rate supercapacitor based on electrochemically reduced graphene oxide for ac line filtering," Sci. Reports, Vo. 2, 2012, pp. 1-5.

S. Zhang, "Graphene based supercapacitor fabricated by vacuum filtration deposition," Journal of Power Sources 206 (2012) 476-482.

L. Basirico and G. Lanzara, "Moving towards high-power, high-frequency and low-resistance CNT supercapacitors by tuning the CNT length, axial deformation and contact resistance," Nanotechnology 23 (2012) 305401.

J.R. Miller, et al., "Graphene Double-Layer Capacitor with ac Line-Filtering Performance," Science 24, vol. 329 (5999): 1637-1639, Sep. 2010.

J. R. Miller, "Introduction to electrochemical capacitor technology," IEEE Electrical Insulation Magazine, vol. 26, Issue 4, Jul.-Aug. 2010, pp. 40-47.

D. Pech et al., "Ultrahigh-power micrometer-sized supercapacitors based on onion-like carbon," Nature: Nanotechnology, 5, 651-654 (2010).

Vasile V. N. Obreja, "On the performance of supercapacitors with electrodes based on carbon nanotubes and carbon activated material—A review," Physica E: Low-dimensional Systems and Nanostructures, vol. 40, Issue 7, pp. 2596-2605 (2007).

A. G. Pandolfo and A. F. Hollenkamp, "Carbon properties and their role in supercapacitors," J. Power Sources, vol. 157, Issue 1 (2006), pp. 11-27.

Ervin, Matthew H., "Etching holes in graphene supercapacitor electrodes for faster performance," Nanotechnology vol. 26 Issue: 23 Article No. 234003. Published: May 21, 2015.

Jiantong Li and Mikael Ostling "Prevention of graphene restacking for performance boost of supercapacitors—a review" Crystals 2013, 3, 163-190; doi:10.3390/cryst3010163.

AVX BestCap® Ultra-low ESR High Power Pulse Supercapacitors brochure, AVX Corporation (Fountain Inn, SC) Available online at: http://catalogs.avx.com/BestCap.pdf (accessed Mar. 14, 2016).

MicroGrid® Precision Expanded Metal and Metal Foil product information, Dexmet Corp. (Wallingford, CT) Available online at: http://www.dexmet.com/Expanded-Metals.html (accessed Mar. 14, 2016).

McNichols® Quality Perforated—Round Hole Products, McNichols Co. (Tampa, FL). Available online at: http://www.mcnichols.com/products/perforated/round-hole/#none (accessed Mar. 14, 2016).

* cited by examiner

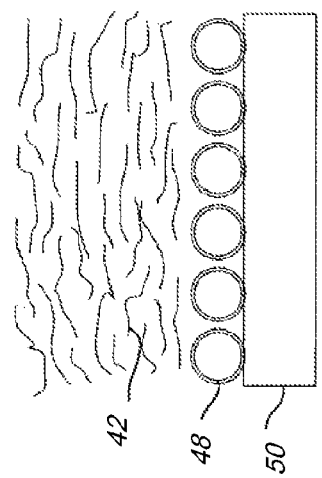
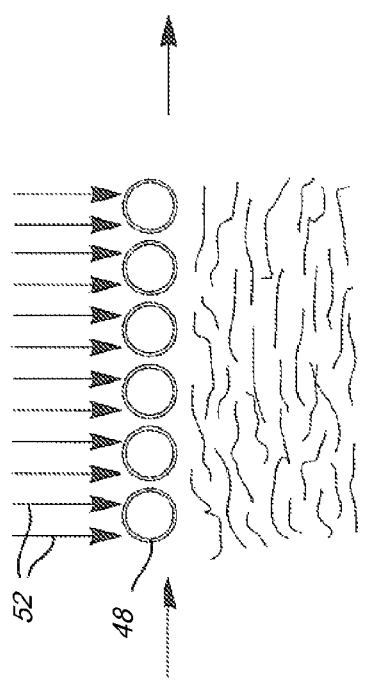
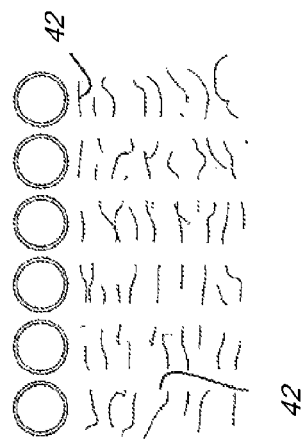

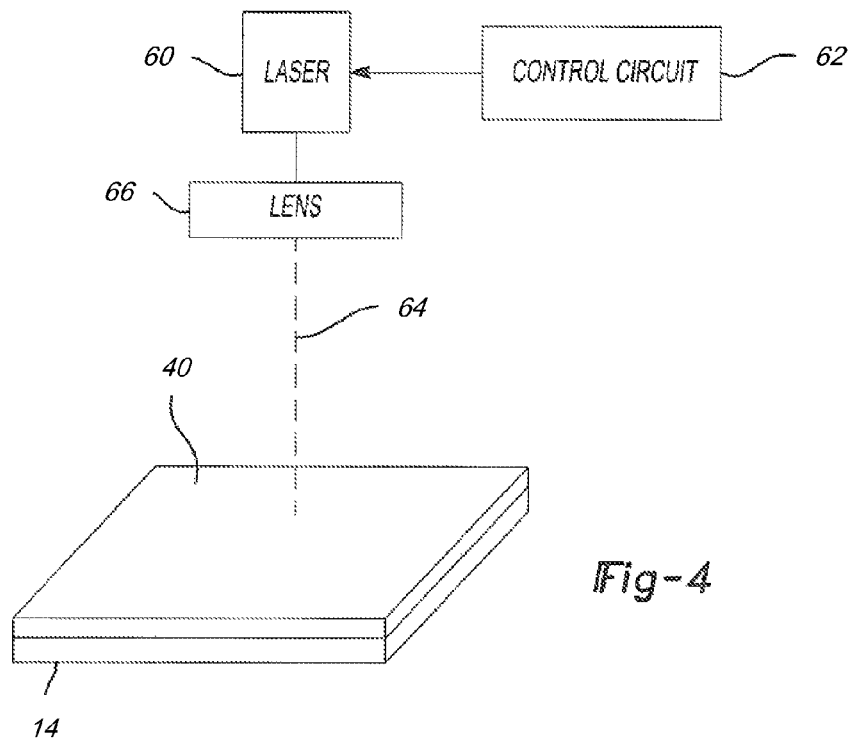
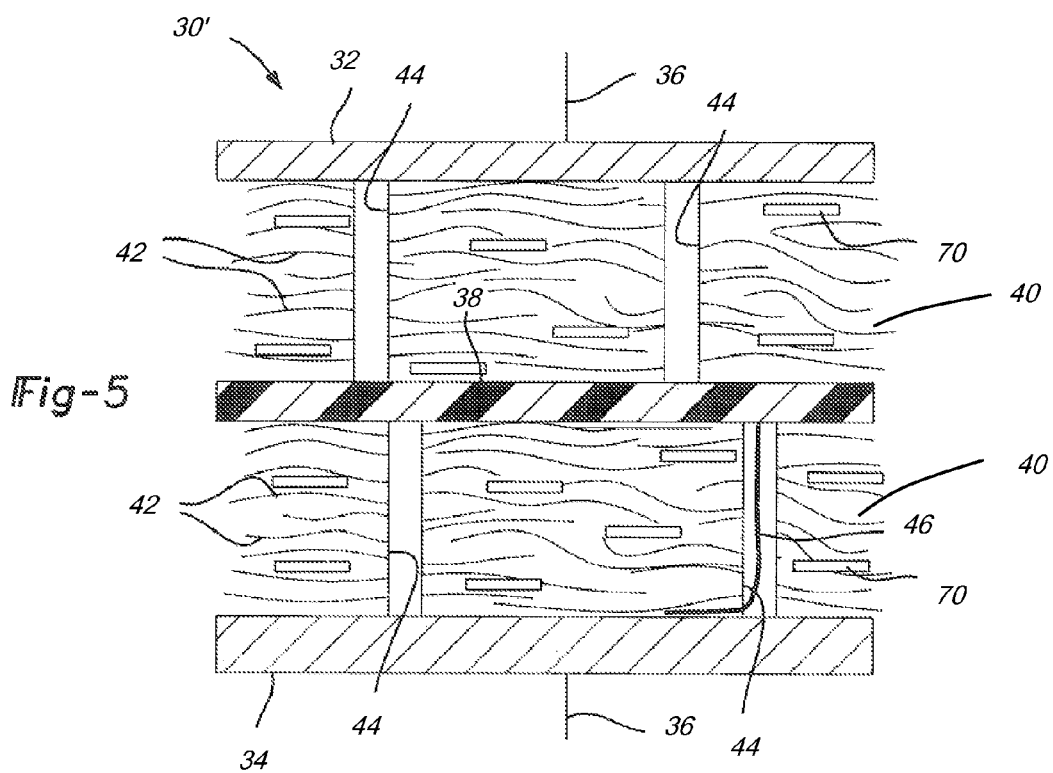

SUPERCAPACITOR

GOVERNMENT INTEREST

The invention described herein may be manufactured, used, and licensed by or for the United States Government.

BACKGROUND OF THE INVENTION

I. Field of the Invention

The present invention relates generally to capacitors and, more particularly, to electrochemical capacitors also known as supercapacitors.

II. Description of Related Art

Capacitors have long been known and used in electronic circuitry for the storage of electrical energy. In its simplest form, the capacitor includes a pair of electrically conductive plates, typically constructed of metal, separated by air or a dielectric material. The size or area of the conductive plates as well as the permittivity and thickness of the dielectric material between the plates determines the magnitude of the capacitance of the capacitor.

Some previously-known capacitors include both electrostatic as well as electrolytic capacitors. Such capacitors have a relatively low capacitance, but are able to operate at voltages ranging from a few volts to thousands of volts. Furthermore, such capacitors are capable of operating at high frequencies.

More recently, supercapacitors have been developed which do not have a conventional dielectric. Instead, supercapacitor electrodes include a conductive plate, known as a current collector, which is coated with a carbon derivative material, such as activated carbon or graphene. These electrodes are typically separated from each other by an intervening separator made from a porous insulating material that prevents the electrical shorting of the electrodes, but allows electrolyte ions to move between the electrodes. In use, when subjected to a voltage, ion flow between the electrodes results in energy storage within the electrodes through the charge separation at the electrode surface with positive charges in one electrode attracting negative ions to that electrode's surface and with negative charges in the other electrode attracting positive ions to that electrode's surface.

A primary advantage of supercapacitors is that they are able to exhibit capacitances up to 10,000 times that of an electrolytic capacitor. Furthermore, such supercapacitors exhibit the greatest energy density of all currently known capacitors.

FIG. 1 shows a sectional view of a prior art supercapacitor 10. The supercapacitor 10 includes a pair of metal current collectors 12 and 14 which are spaced apart. A porous separator 16 made of an electrical insulating material is positioned in between the two metal current collectors 12 and 14. Electrodes 18, formed of carbonaceous material 20, such as activated carbon, carbon nanotubes, or graphene, are deposited on each current collector 12 and 14.

During both charging and discharging of the prior art supercapacitor 10, electrolytic ions must travel between particles or flakes of the carbonaceous material 20 in order to access the full surface area of the electrodes 18 so as to store as much energy as the device can hold. Since the electrolytic ions cannot travel directly through the particles or flakes of carbonaceous material, the ions must travel around them. One exemplary long and tortuous path of an ion traveling through the particles or flakes of carbonaceous material 20 is shown at 24 and effectively increases the ionic impedance of the electrode.

Supercapacitors do, however, suffer from some disadvantages due, in part, to the extended path necessary for the ions to travel during both charge and discharge. First, the previously known supercapacitors were limited to operate at low frequencies, typically less than 1 Hertz. Such low frequencies, of course, limit their applications in electrical circuits.

A still further disadvantage of these previously known supercapacitors is that the rate of charging, as well as discharging, is relatively slow. This relatively slow charging and discharging of the supercapacitor is due primarily to the ionic impedance present in the carbon based electrodes used for the supercapacitor.

SUMMARY OF THE PRESENT INVENTION

The present invention provides a supercapacitor or electrochemical capacitor with reduced ionic impedance of the electrodes which greatly increases the frequency of operation as compared with the previously known supercapacitors. This means that supercapacitors according to embodiments of the present invention enjoy faster discharge and charging time compared with other previously known supercapacitors.

In brief, the supercapacitor comprises spaced apart electrodes which are separated from each other by a separator. The separator is made of an electrical insulating material, such as a porous polymer.

Each of the electrodes is formed of carbonaceous material and capable of being impregnated with a liquid electrolyte. Metal current collectors are provided on the sides of the electrodes opposite from the separator. The electrical energy storage is achieved by charge separation at the electrode carbonaceous material surfaces.

Unlike the previously known supercapacitors, according to embodiments of the present invention, holes are formed through the electrodes. The holes extend generally from the metal current collector and towards the separator, and may be aligned, preferably in a grid pattern. These holes within the electrodes facilitate the rapid travel of electrolyte ions through the electrode thickness. Thus, since the electrolyte ions travel throughout the electrodes during charging and discharging, more rapid charging and discharging of the supercapacitor is achieved.

Different methods may be used to form the holes through the electrodes. In one method, carbonaceous material of the electrode is deposited on a metal mesh current collector which can be done using various methods such as drop casting, doctor blading, air brushing, filtration, or similar. The metal mesh current collector has a very small pitch such as 2000 lines per inch, and a low transmission percentage such as 5-10%. The latter is important as it prevents the electrode etching methods from removing too much of the carbonaceous material. Using the mesh current collector as a mask, the holes are milled through the carbonaceous material in a grid pattern using various methods such as ion milling or oxygen reactive ion etching that produce an anisotropic etch of the carbonaceous material. Alternatively, the metal mesh current collector could be used to mask a photochemical or photoelectrochemical etch of the carbon. Still another approach would be to use laser drilling of the holes in the layer of carbonaceous material. This method could be used to pattern the hole arrays in the electrodes without the need for a mesh current collector to mask the etch process. And, in yet other embodiments, a photolithographic approach with associated anisotropic etching could also be performed without the need for the mesh; rather the holes can be patterned using a resist material.

The provision of the holes through the electrodes effectively reduces the otherwise tortuous path of ions traveling through the electrode since the holes provide a direct path through the carbonaceous material to access the full surface area of the electrode. This effectively reduces both charging and discharging time of the capacitor.

Or to put it another way, the supercapacitors according to embodiments of the present invention is able to operate at higher frequencies than the previously known supercapacitors.

In some embodiments of the invention, nanotubes and/or nanoparticles may be further intermixed with the carbonaceous material. The nanotubes or nanoparticles produce additional space between particles or flakes of the carbonaceous material making ionic transport within the electrode plane easier while the etched holes in the electrodes provide easier ionic transport perpendicular to the electrode plane. This combination, in turn, results in increased frequency of operation as well as increased discharge and charging speed for the supercapacitor by achieving reduced ionic impedance.

BRIEF DESCRIPTION OF THE DRAWING

A better understanding of embodiments of the present invention will be had upon reference to the following detailed description, when read in conjunction with the accompanying drawing, wherein like reference characters refer to like parts throughout the several views, and in which:

FIGS. 3A, 3B, and 3C are diagrammatic views illustrating one method of manufacture of the supercapacitor according to an embodiment of the present invention;

FIG. 4 depicts alternative method of creating an array of holes in the electrode according to another embodiment of the present invention; and FIG. 5 is illustrates another supercapacitor according to a further embodiment of the present invention.

DETAILED DESCRIPTION OF PREFERRED
EMBODIMENTS OF THE PRESENT
INVENTION

Figure 1:
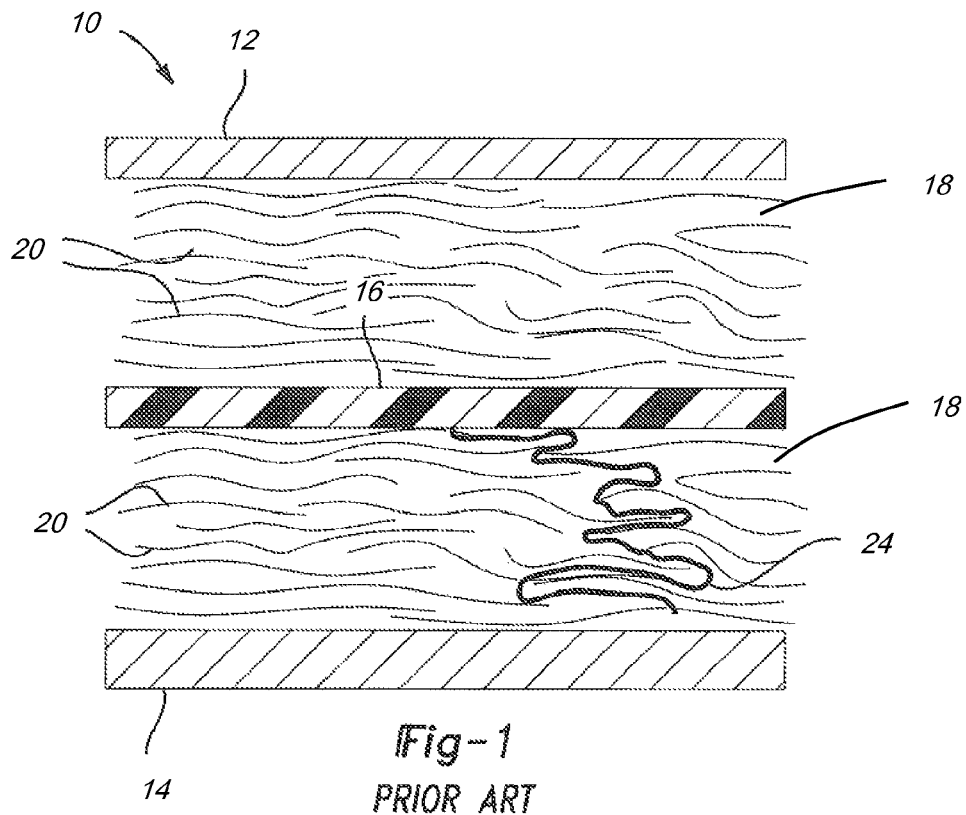
FIG. 1 is a fragmentary sectional view of a prior art supercapacitor and illustrating an exemplary travel of an electrolyte ion path through the electrode.
Figure 2:
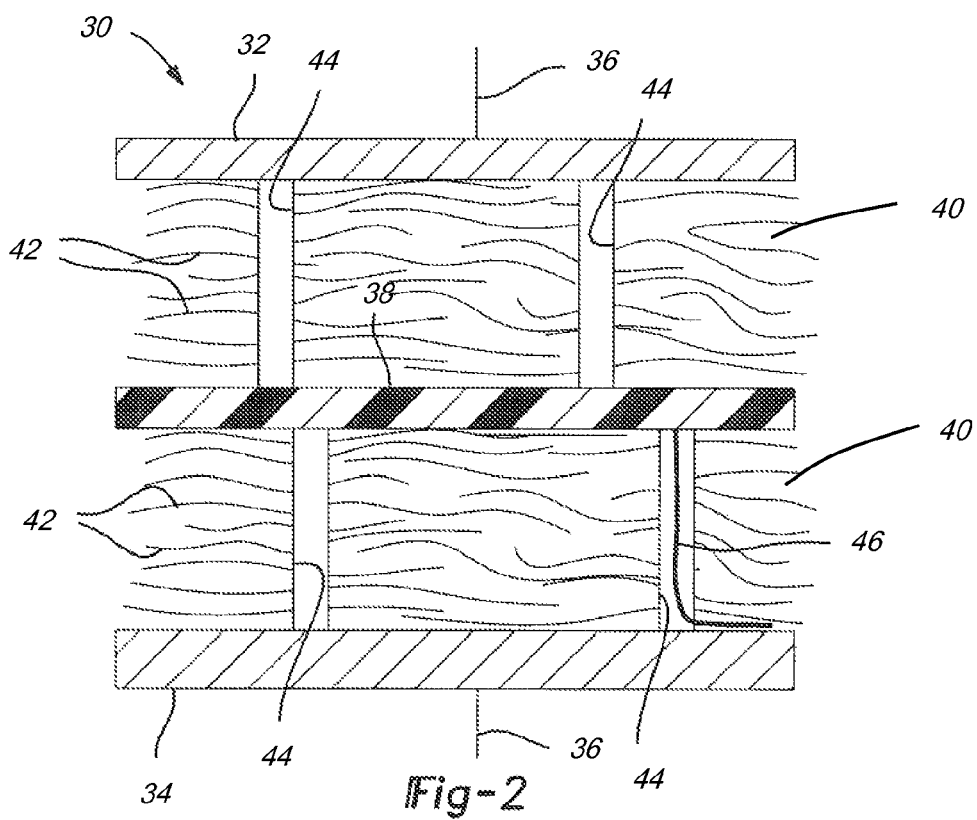
FIG. 2 is a fragmentary sectional view of a supercapacitor having holes in the electrodes according to an embodiment of the present invention and illustrating an exemplary travel of an electrolyte ion path through one hole in the electrode.

With reference first to FIG. 2, a first embodiment of a supercapacitor or electrochemical capacitor 30 according to the present invention is shown. Like the previously known supercapacitors of FIG. 1, the supercapacitor 30 generally includes a pair of spaced apart metal current collectors 32 and 34 which are spaced apart by a few microns to a few hundred microns and are parallel to each other. Each current collector 32 and 34 is connected to its associated electrical circuit (not shown) by a lead 36.

A separator 38 constructed of an electrical insulating material, such as a porous polymer, is positioned in between the metal current collectors 32 and 34 and thus separates a pair of electrodes 40 from each other. Any conventional material may be used for the separator 38.

The electrodes 40 are porous electric conductive electrodes which are impregnated with liquid electrolyte (not shown) which provides a source of electrolytic ions. When bias voltage is applied between the two electrodes 40, positive charge at an exposed surface of one electrode attracts negative ions from the electrolyte and negative charge at an exposed surface of the other electrode attracts the positive ions from the electrolyte. Carbonaceous material 42 can be deposited or otherwise provided on the current collectors 32 and 34 to form porous material electrodes 40.

The carbonaceous material 42 can include particles or flakes of a carbon-based material which can sufficiently transfer an electric charge and/or is sufficiently porous for enabling electrolytic ions to flow in the electrodes 40, thus functioning as a supercapacitor. Such carbonaceous material may include, for example, graphene, carbon nanotubes (CNT), porous carbon, activated carbon (AC), or any combination thereof. For graphene, in particular, it may be applied as particles or flakes on the order of about 1 micron in diameter. The graphene particles or flakes will generally arrange parallel to the current collectors and bind together by van der Wales forces so as to form sheets in a stack. While two electrodes 40 are illustrated in the figures, it should be appreciated that additional electrodes can be stacked in a similar manner in keeping with the scope of the invention with a separator 38 provided between adjacent electrodes 40.

In some embodiments, the electrodes 40 may further include a binder, conductivity enhancing material (such as carbon-black) and/or pseudo capacitive materials (such as conductive polymers or oxides of transition metals) mixed with the carbonaceous material 42.

The carbonaceous material 42 thus provide the necessary storage surface area for the ions when the capacitor 30 is charged. Most conventional methods may be used to deposit the carbonaceous material 42 onto the current collectors 32 and 34.

Unlike the previously-known supercapacitors, however, holes 44, each having a diameter in the range of nanometers to microns, are formed through the electrodes 40. These holes 44 provide a pathway for travel of the electrolytic ions during charging and discharging of the capacitor 30. For example, an exemplary ion travel path 46 is illustrated in FIG. 2 in which ions travel not around each of the many layers of particles and flakes of the carbonaceous material 42 in the electrodes 40, but rather directly through the holes 44. As such, since ions travel a much less tortuous path 46 to go through the electrode thickness as compared to the prior art path 24 (FIG. 1). This effectively reduces the ionic impedance of the carbonaceous material 42 in the electrodes 40 to that required for traveling a short distance laterally in the electrode which enables faster charging and discharging of the capacitor 30 which is also seen as an increased operational frequency.

Although only two holes 44 are illustrated through the electrodes 40 in FIG. 2, it will be appreciated that typically there will be many holes 44 formed through the electrodes 40, preferably in an orthogonal grid pattern. For example, in one embodiment, a hole 44 is provided approximately every 9-13 microns in a grid pattern so that the holes 44 constitute about 8% of the overall area of one side of the electrode 40. This configuration of holes 44 is not to be construed as limiting and it should be appreciated that other hole patterns and configurations are contemplated.

Furthermore, the faster travel of the electrolytic ions through the carbonaceous material 42 of the electrodes 40 due to the holes 44 enables higher frequency of operation for the supercapacitor 30 than with the previously known supercapacitors. The inventor has demonstrated a 100-fold increase in speed (e.g., 0.1 Hz to about 10 Hz) in experiments with the inclusion of holes 44 in the supercapacitor 30. This is a significant improvement in the operating range compared to conventional supercapacitors having which operate typically less than 1 Hz.

With reference now to FIGS. 3A-3C, one method of creating the holes 44 through the carbonaceous material 42 of the electrodes 40 is illustrated. In FIG. 3A, particles or flakes of carbonaceous material 42 are deposited on a metal mesh 48 using one of many conventional methods, such as by filtration or air brushing. A layer of filter paper or other appropriate barrier 50 covers the opposite side of the mesh 48 to keep too much carbonaceous material 42 from passing through the mesh and being lost.

With reference now to FIG. 3B, after the carbonaceous material 42 has been deposited on the mesh 48, the filter paper 50 is removed. The mesh 48 is then subjected to an anisotropic etch such as oxygen reactive ion etching or argon ion milling, indicated by incident etching particles 52, such as oxygen ions, which etches, mills or abrades the holes 44 in the carbonaceous material 42 as shown in FIG. 3C.

With reference now to FIG. 4, an alternative method for forming the holes 44 through the electrodes 40 is shown. The carbonaceous material 42 forming an electrode 40 is first deposited on the metal current collector 14 in any conventional fashion, such as filtration or air brushing. The metal collector 14 is then positioned beneath a laser 60 so that the electrode 40 faces the laser 60. The laser 60 is then activated under control of a control circuit 62 to drill holes through the electrode 40 by a laser beam 64. The control circuit controls the positioning of the beam from the laser 60, either directly or through a lens system 66, or the position of the electrode 40, to vary the position of the laser beam 64 on the electrode 40 and preferably create the same grid pattern as with the ion milling depicted in FIGS. 3A-3C.

In other embodiments, a photolithographic approach with associated anisotropic etching could also be performed without the need for the mesh; rather the holes 44 can be patterned in the electrodes 40 using a resist material.

With reference now to FIG. 5, another embodiment of a supercapacitor 30' is shown. Unlike the previously described embodiment of the present invention, in the supercapacitor 30' of FIG. 5, a plurality of nanotubes 70 or nanoparticles and/or nanowires having a diameter of nanometers to microns, are intermixed with the carbonaceous material 42 forming the electrodes 40. The nanotubes 70 may extend generally in a direction parallel to the metal current collector 14 and the separator 38. These nanotubes or nanoparticles 70 prop the carbonaceous material 42 apart providing wider passageways or pores for the electrolytic ions to travel laterally away from or to the etched holes 44 that provide easy ion transport in the direction perpendicular to the current collector, as shown by an exemplary path 44 which is shorter than the more tortuous path 24 (FIG. 1) of the prior art. As previously discussed, this lowers the ionic impedance (and perhaps the electronic impedance of the electrode) and results in reduced charging and discharging time for the supercapacitor as well as increased operating frequency for the supercapacitor.

From the foregoing, it can be seen that the present invention provides a supercapacitor which enjoys improved charge and discharge times as compared to the other previously known supercapacitors by reducing the ionic impedance of the supercapacitor. Such reduction also results in increased frequency operation for the supercapacitor.

Having described my invention, however, many modifications thereto will become apparent to those skilled in the art to which it pertains without deviation from the spirit of the invention as defined by the scope of the appended claims.

I claim:

1. An electrochemical capacitor comprising:
   spaced apart electrodes separated by a separator made of an electrical insulating material, each of said electrodes formed of carbonaceous material and capable of being impregnated with a liquid electrolyte; and
   a pair of metal current collectors on the sides of said electrodes opposite from said separator,
   said electrodes having a plurality of spaced holes extending through the carbonaceous material between said metal current collector and said separator,
   wherein the holes are spaced apart between about 9-13 microns to create a direct pathway for travel of the electrolytic ions during charging and discharging of the capacitor thereby significantly increasing the operational frequency of the capacitor.

2. The capacitor as defined in claim 1 wherein said holes are evenly spaced from each other in a grid pattern.

3. The capacitor as defined in claim 1 further comprising a plurality of nanotubes, nanoparticles, and/or nanowires intermixed with said carbonaceous material forming the electrodes.

4. The capacitor as defined in claim 1 wherein said carbonaceous material comprises: graphene, carbon nanotubes, porous carbon, activated carbon, or any combination thereof.

5. The capacitor as defined in claim 1 wherein said carbonaceous material further comprises: a binder, conductivity enhancing material, a pseudo-capacitive material, or any combination thereof.

6. The capacitor as defined in claim 1, wherein the holes have a pitch of approximately 2000 lines per inch.

7. The capacitor as defined in claim 1, wherein the holes are spaced apart so as to constitute about 8% of the overall area of one side of at least one of the electrodes.

8. The capacitor as defined in claim 1, wherein the capacitor is configured to operate at a frequency up to about 10 Hz.

9. A method of manufacturing an electrochemical capacitor comprising the steps of:
   creating at least two electrodes formed of carbonaceous material and capable of being impregnated with a liquid electrolyte,
   forming a plurality of holes through said carbonaceous material of said electrodes, wherein the holes are spaced apart between about 9-13 microns to create a direct pathway for travel of the electrolytic ions through the electrode thickness during charging and discharging of the capacitor thereby significantly increasing the operational frequency of the capacitor,
   positioning a first side of each electrode on opposite sides of a separator constructed of an electrical insulating material, and
   attaching an electrically conductive current collector on a second side of each of the electrodes.

10. The method as defined in claim 9 wherein said holes are nanometers to microns in diameter.

11. The method as defined in claim 9 wherein said forming step comprises lasing said holes through said electrodes.

12. The method as defined in claim 9 wherein said forming step comprises forming said holes by anisotropic etching.

13. The method as defined in claim 12 wherein said anisotropic etching step comprises oxygen reactive ion etching or argon ion milling.

14. The method as defined in claim 9 further comprising mixing a plurality of nanotubes, nanoparticles, and/or nanowires in said carbonaceous material forming the electrodes.

15. The method as defined in claim 9 wherein the holes are patterned using photolithography.

16. The method as defined in claim 9 wherein the holes are patterned using a mesh.

17. The method as defined in claim 16, wherein the at least two electrodes are created by depositing the carbonaceous material on the mesh and the mesh is also used as a template for forming the holes.

18. The method as defined in claim 16, wherein the mesh has a transmission percentage of about 5-10%.

19. A method of manufacturing an electrochemical capacitor comprising:
    providing at least two electrodes formed of carbonaceous material and capable of being impregnated with a liquid electrolyte, and
    forming a plurality of holes through said carbonaceous material of said electrodes,
    wherein the holes are spaced apart between about 9-13 microns to create a direct pathway for travel of the electrolytic ions during charging and discharging of the capacitor thereby significantly increasing the operational frequency of the capacitor.

* * * * *